United States Patent
Tank et al.

(10) Patent No.: US 12,548,183 B2
(45) Date of Patent: Feb. 10, 2026

(54) PRIVACY PRESERVING SENSOR INCLUDING A MACHINE-LEARNED OBJECT DETECTION MODEL

(71) Applicant: Google LLC, Mountain View, CA (US)

(72) Inventors: Vikram Vasant Tank, Jersey City, NJ (US); William Sumner Rutledge, Austin, TX (US); Kai S. Yick, Dale City, CA (US); Carlos Henrique Esteves Mendonca, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 400 days.

(21) Appl. No.: 17/922,120

(22) PCT Filed: Apr. 30, 2020

(86) PCT No.: PCT/US2020/030778
§ 371 (c)(1),
(2) Date: Oct. 28, 2022

(87) PCT Pub. No.: WO2021/221671
PCT Pub. Date: Nov. 4, 2021

(65) Prior Publication Data
US 2023/0177717 A1 Jun. 8, 2023

(51) Int. Cl.
*G06T 7/70* (2017.01)
*G06V 10/82* (2022.01)
(Continued)

(52) U.S. Cl.
CPC ............... *G06T 7/70* (2017.01); *G06V 10/82* (2022.01); *G06V 20/44* (2022.01); *G06V 20/625* (2022.01);
(Continued)

(58) Field of Classification Search
CPC ........... G06T 7/70; G06T 2207/30242; G06V 2201/07; G06V 20/52
See application file for complete search history.

(56) References Cited

U.S. PATENT DOCUMENTS 9,836,484 B1 12/2017 Bialynicka-Birula et al.
2017/0172463 A1* 6/2017 Papadopoulos .... G08B 21/0453
(Continued)

FOREIGN PATENT DOCUMENTS

CN 110574352 12/2019
WO WO 2019/224791 11/2019

OTHER PUBLICATIONS

International Preliminary Report on Patentability for PCT/US2020/030778, mailed on Nov. 10, 2022, 14 pages.
(Continued)

*Primary Examiner* — Ming Y Hon
*Assistant Examiner* — Amanda H Pearson
(74) *Attorney, Agent, or Firm* — DORITY & MANNING P.A.

(57) ABSTRACT

In general, the disclosure is directed to lightweight sensors that enable privacy preserving detection of objects or related information present in image data. One aspect of the disclosure includes detection methods that do not require information such as motion or thermal in determining object detection. Rather, implementations can utilize a machine-learned model to determine whether objects of a type are present in an image. To account for possible generation of private data, example implementations can include hardware and/or a computing architecture configured to only maintain or transmit sensor signals generated based at least in part on output of the machine-learned model.

23 Claims, 7 Drawing Sheets

(51) Int. Cl.
    *G06V 20/40* (2022.01)
    *G06V 20/62* (2022.01)
    *H04N 23/51* (2023.01)

(52) U.S. Cl.
    CPC ... *H04N 23/51* (2023.01); *G06T 2207/30196* (2013.01); *G06T 2207/30242* (2013.01); *G06V 2201/07* (2022.01)

(56) References Cited

U.S. PATENT DOCUMENTS

| | | | |
|---|---|---|---|
| 2020/0017117 A1* | 1/2020 | Milton | G08G 1/0112 |
| 2021/0052246 A1* | 2/2021 | King | A61B 8/488 |
| 2021/0062549 A1* | 3/2021 | Shelke | E05B 65/006 |
| 2021/0188205 A1* | 6/2021 | Adusumalli | G06V 10/25 |
| 2021/0216784 A1 | 7/2021 | Savaresi et al. | |
| 2022/0161815 A1* | 5/2022 | Van Beek | B60W 50/00 |

OTHER PUBLICATIONS

International Search Report and Written Opinion for PCT/US2020/030778, mailed on Mar. 22, 2021, 20 pages.
Chinese Search Report Corresponding to Application No. 2020801003034 on Nov. 28, 2025.

* cited by examiner

FIG. 4

PRIVACY PRESERVING SENSOR INCLUDING A MACHINE-LEARNED OBJECT DETECTION MODEL

PRIORITY CLAIM

This application is based upon and claims the right of priority under 35 U.S.C. § 371 to International Application No. PCT/US2020/030778 filed on Apr. 30, 2020, which is incorporated by reference herein.

FIELD

The present disclosure relates generally to sensors useful for accurate detection of people, objects, object parameters or other tasks. More particularly, the present disclosure relates to a lightweight and/or single package sensor that includes a machine-learned model trained to perform a detection task by processing input from image or other sensors and that may provide more effective privacy preservation by converting model output into an analog sensor output (e.g., a voltage).

BACKGROUND

Various types of sensors exist that perform presence detection based on information obtained from the area evaluated by the sensor. As examples, sensors can include motion detectors that operate based on infrared light, noise detectors, SSID sniffers (e.g., cell phone pings), and/or microwave interference sensors. While information obtained from these sensors can be helpful, such sensors often have low accuracy or precision, are unable to identify specific objects, can be confused by similar subjects (pets vs people), and, in the case of infrared or noise-based sensors, are unable to count a number of objects present within the area.

Computer vision-based systems that use visible or near visible light to detect objects such as human persons provide one solution to this drawback. However, these systems often stream all image data to a central location, thereby capturing and transmitting large amounts of extraneous or ambient information not directly related to the motion or presence detection task. Some of the additional information can include data that is privacy sensitive, and the security practices of this data are not standardized, verifiable, or attestable. Thus, continuous capture and storage of the video streams from these devices can make them vulnerable to attack and lead to reduced data privacy. Furthermore, these sensors do not provide a method to understand the function, privacy, and security features of the sensors.

Therefore, needed in the art are sensors that can mitigate the accuracy issues of existing motion or presence detection sensors while also providing improved privacy and/or data security and make those qualities visible to the observed.

SUMMARY

Generally, the present disclosure is directed to lightweight sensors that enable privacy preserving detection of objects or related information that can be derived from the image data. One aspect of the disclosure includes detection methods that do not require information such as motion or thermal in determining object detection. Rather, implementations can utilize a machine-learned model to determine whether objects of a type are present in an image. To account for possible generation of private data, example implementations can include hardware and/or a computing architecture configured to only maintain or transmit sensor signals generated based at least in part on output of the machine-learned model.

Another example aspect of the present disclosure can include a sensor design. Since example sensors of the disclosure can be tailored to perform a specific task, the computing architecture can be optimized to reduce memory requirements while maintaining high-quality performance. These features can allow for smaller sensor footprints due to the reduced memory requirements. Further, some sensors can be fully enclosed and not include an interface for accessing and/or modifying the computing architecture (e.g., the machine-learned model).

One additional aspect of the present disclosure can include one or more privacy preserving features. For example, some sensors may include machine-learned models having static parameters or lack interfaces for changes parameters of the machine-learned models. Further, certain sensors can be configured to only store image data in transient memory and/or directly convert image data, machine-learned model outputs, or both to a sensor signal (e.g., an electric signal.) In this manner, some sensors can be configured to directly process image data to generate an output (e.g., the sensor signal) that is striped of personally identifying information.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to a single-package, lightweight sensor that enables privacy preserving detection of objects (e.g., human persons) and/or information related to the objects present in image data. An example aspect of the disclosure includes detection methods that do not require information such as motion, SSID, thermal, and/or other similar methods in assessing detection of the object. Rather, example systems and methods according to the present disclosure utilize a machine-learned model trained to determine whether one or more objects of a particular object type are present in an image. In this manner, object detection is based on identification of features that would be unique to the object rather than a proxy trigger that could easily produce a false positive. While use of machine learning in this fashion can provide an advantage over other technologies, image analysis using machine-learned models can typically generate personal data that older technologies would render ambiguous or fail to collect. To account for this, a further aspect of example implementations according to the present disclosure can include hardware and/or a computing architecture configured to maintain or provide only sensor signals generated based at least in part on an output generated by the machine-learned model or numeric information (e.g., object count) derived from the sensor signal, without maintaining or providing the underlying image data itself. For example, in some implementations, a sensor can be configured to generate a sensor signal describing a count of objects in an image without storing the image itself in any non-temporary fashion or transmitting that image outside the bounds of the sensor (e.g., without storage of the image in a non-volatile memory). Thus, certain example implementations may include substantially real-time processing so that image data can be directly converted into a sensor signal (e.g., an electric signal) without requiring long-term or non-temporary storage of outputs and/or intermediate values (e.g., hidden layers) generated by the machine-learned model.

As one example, a traditional sensor using heat or motion detection may be triggered by an animal (e.g., a pet) moving through the area evaluated by the sensor. In contrast, implementations according to the present disclosure can utilize a machine-learned model to process image data to generate an output (e.g., with some confidence value) that the image includes at least one object of a certain object type and/or class. Additionally, the output of the machine-learned model can be directly used to generate a sensor signal to reduce and/or completely remove any traces of identifying or personal information that could be associated with the image data, intermediate outputs of the machine-learned model, or outputs of the machine-learned model. This signal can subsequently be used to trigger other actions such as turning on/off a light(s) or HVAC system, contacting a security company, and/or sending a notification. As one example, the sensor can include only a limited number and/or modality of communications interfaces or interconnects such as, for example only a single analog electrical interface for outputting the sensor output using an electrical signal.

One example implementation of the disclosure can include a single package sensor having one or more cameras coupled to a lightweight computing system including processor(s) and memory. The computing system can be protected by a housing that provides a barrier surrounding at least the computing system. Additionally, the lightweight sensor can include one or more communications interfaces, though generally these communications interfaces may, in some implementations, be limited to provide and/or transmit only an analog signal such as an electric signal. Aspects of the memory can include a temporary data buffer for storing transient information as well as non-volatile memory that stores a machine-learned object detection model configured to determine a presence of one or more objects of a particular object type for an image, a property of the one or more objects, or both the presence and the property of the one or more objects. The non-volatile memory can also include instructions that, when executed by the one or more processors, can cause the sensor to perform operations associated with object detection. More particularly, the operations can include storing, in the temporary data buffer, a data stream that includes a sequence of one or more image frames captured by at least one of the one or more cameras. Further, the data stream can be provided to a machine-learned object detection model that can be stored locally on the sensor to generate a model output. One aspect of the machine-learned model can include one or more fixed parameters so that the model can be configured to perform a particular task. Additionally, for certain implementations the model can be immutable both to expand any of its functions and/or update any of its settings. Using the data stream as input the object detection model can generate a model output, and based at least in part on the model output, the sensor can determine (e.g., based on a device policy, output logic and/or a policy selector) a sensor output that the sensor can maintain and/or produce for transmitting using a communications interface.

An example aspect of the machine-learned object detection model can include a model architecture. For example, in some implementations the machine-learned object detection model can include a neural network having one or more hidden layers. Each hidden layer can be associated with one or more learned parameters (e.g., weights). Further, in certain implementations, the learned parameters can be held static such that the parameters are not adjusted or adjustable during operation and/or a lifetime of the sensor.

Aspects of the machine-learned model can be adjusted using different training data. For instance, the machine-learned model can be trained to perform object detection using camera imagery obtained from various poses to generate high-confidence object detection independent of camera position and/or angle. Additionally, the machine-learned model or a second machine-learned model included as part of the system can be trained to perform other learned algorithms. As one example, learned algorithms can include algorithms for object localization such as generating a bounding box for each instance of an object, a centroid position for each object, a mask designating background imagery from object imagery, or other similar algorithms.

In some implementations, the sensor output can be an electric signal (e.g., a voltage). Thus, at a general level, the device may signal the presence of an object captured by one of the cameras and processed through the neural network by generating a voltage. In certain implementations, the voltage can be static. Alternatively, the voltage may be variable. Both static and variable voltages may be used to indicate information other than the presence of an object such as the number of objects (e.g., based on the number of bounding boxes) in the area evaluated by the one or more cameras. For instance, a series of static voltages within a timespan may be used to indicate a count of objects. Alternatively, the voltage value can be mapped to a count using a predefined protocol such as I2C to convey more complex information such as whether an object entered or left the area can be inferred by the difference in counts.

An aspect of sensors according to the present disclosure can include a single package, light-weight design. Since implementations can include features such as direct processing of input data, processing and memory requirements can produce devices with smaller footprints. More particularly, example sensors may include a housing surrounding at least the computing system (e.g., processor and memory). For some implementations, the housing may define a volume inclusive of the range about 100 to about 2000 mm$^3$ such as a volume of about 150-1800 mm$^3$, 180-1500 mm$^3$, 200-1300 mm$^3$, 250-1000 mm$^3$, or 350-800 mm$^3$. More preferably, for certain implementations, the housing may define a volume inclusive of the range about 100 to about 600 mm$^3$ such as a volume of about 150-550 mm$^3$, 180-520 mm$^3$, 200-500 mm$^3$, or 250-450 mm$^3$.

In addition to size, the housing can include one or more features to reduce tampering with the computing system of the lightweight sensor. As one example, to help preserve privacy it may be advantageous to seal the computing system in a housing that provides tamper resistant features such as lacking an interface for accessing the computing system. Additionally or alternatively, in some implementations, the housing may be made of a material such as an epoxy, a plastic, a metal, or a ceramic that must be broken to access the computing system inside the housing. For instance, the housing may not include any screws or other access points and so may provide a substantially continuous and uninterrupted barrier around the computing system. Thus, accessing the computing system would require breaking the continuous barrier to access the computing system. Additionally or alternatively, the housing may include tamper evident features that can indicate if someone has attempted to access the computing system. As one example, the housing may include access points that include a trigger which is activated when a person attempts to access the access point. The trigger can include visible features such as a component of the device that breaks and/or fractures when a person accesses the access point. In some instances, the trigger can also include deactivating and/or erasing electronic data stored on the computing system.

In some implementations, to give the observed users of the system the ability to interrogate sensors and understand their purpose there can be a second output that is tightly coupled to the signal output that makes evident the data sent by and security properties of the sensor. This can be done by flashing the sensor output through an LED light, ultrasonic beacon, or some other low cost beaconing system to allow both human and machine observers to understand the sensor. An example of this would include flashing the count of people in the FOV on a visible light LED. A second example would include flashing a high speed sequence that can be read by an accompanying mobile app to allow deeper inspection of the sensor's purpose, privacy policies, and data security practices.

Thus, another aspect of example implementations can include a sensor design having a transmitter component configured to generate a signal from the sensor to indicate a sensor operation and/or use. For instance, certain sensor designs may include a light source (e.g., a light emitting diode or similar feature) that can light up (or some other change in operation) when the system detects a certain object (e.g., a person). Alternatively or additionally, the transmitter component may be configured to provide various signals such as different light patterns or sequences to provide signaling information about device operation such as privacy characteristics, device tasks (e.g., object type), and/or sensor outputs.

In addition, for some sensors in accordance with the present disclosure, the sensor may also include instructions for identifying a specific feature in the image data, such as a dynamic token (e.g., presented by a user in the captured image), and generating a response based on the dynamic token (e.g., entering into an authentication mode in which the sensor identifies itself). As one example, a sensor may be designed as having instructions for communicating with external devices via an application programming interface (API). The API can include instructions for generating imagery such as a token that can processed by the sensor computing system to determine a device policy such as a response signal that can be produced by the sensor (e.g., by the transmitter component of the sensor).

A further aspect of example implementations can include privacy features that may be incorporated in the sensor design. For instance, some implementations can include a design that computing system contents (e.g., memory such as ROM contents) can be extracted for verification. In these implementations, a hash of the computing system contents (e.g., ROM contents) can be made publicly available. Certain implementations can include computing system policies that can limit the sensors to only execute operations coded on certain types of memory. For instance, some sensors can be configured to only execute code on ROM, which can help prevent malicious code from being loaded on and/or executed on the sensor. Additionally, for some implementations, determining a sensor output and/or a model output may include generating a private key. The private key can be associated with the sensor output and/or the model output, enabling the sensor's authenticity to be confirmed by decoding outputs with its public key. For example, the key-based or other forms of authentication can be performed to prevent systems from taking presence detector input from non-certified sensor devices.

Another aspect of example implementations can include instructions for removing/deleting temporary data. For instance, after accessing the data stream from the temporary data buffer to generate the model output, the underlying data (e.g., the data stream stored as part of the temporary data buffer) can be deleted. Deleting the data can include replacing the data with new incoming data (e.g., deletion may occur by way of replacement in a first in first out ring buffer or the like). By maintaining underlying data in temporary storage, example implementations can exhibit decreased memory requirements which can further serve to limit the device footprint. In some implementations, the sensor can be tailored to a specific application. For example, a single purpose machine-learned model can be tailored to a certain processor architecture and pruned to reduce its size, which can further reduce device requirements for processing power and memory. Additionally, such implementations can also provide privacy benefits by limiting storage of identifiable information.

In general, implementations can include one or more cameras that are directly and/or communicably coupled to the computing system. For some implementations, the cameras or a portion of the cameras may also be enclosed in the housing. Alternatively, for some implementations the cameras may be separate from the housing and camera data may be transmitted to the computing system using wired or wireless protocols.

Aspects of the one or more cameras can include a camera type descriptive of the image data that the camera obtains. For example, an RGB camera can be included in example systems for obtaining photographic or video imagery of the visible light spectrum. As another example, an IR camera can be included in example systems for obtaining infrared signals indicative that a living object (e.g., an object radiating heat), rather than a virtual or fabricated object is detected. Thus, while implementations according to the present disclosure do not necessarily require such information for identification of the object, this information may still be obtained and utilized in example systems and methods for other purposes such as filtering data that isn't descriptive of the object or initiating activation of a system component (e.g., one of the one or more cameras). For instance, certain implementations may also include a motion sensor in communication with the computing system and/or the one or more cameras. More particularly, the motion sensor can be used to initiate activation of at least one of the one or more cameras to begin capturing image data. In this manner, example systems and methods may utilize other detector information to moderate device performance, without relying only on said detector information to determine whether or not the object is detected.

One example aspect of the image data can include a frame rate captured by the camera. Example implementations according to the present disclosure can be used to process image data captured in substantially real time. As used herein, substantially real time can indicate that the image data received at a certain frame per second (fps) can be processed and output as a sensor signal at about the same rate (sensor signal per second) within ±0.1%. Some example implementations according to the present disclosure can operate at a frame rate of about 2 to about 15 fps. The one or more cameras can each capture a continuous sequence of one or more frames defining the frame rate for the respective camera. These one or more frames can be considered as a data stream that is provided to the machine-learned object detection model stored locally on the sensor (e.g., a computing system included in the sensor).

Aspects of the machine-learned object detection model can include an input-output configuration. For instance, the machine-learned object detection model can be configured to generate a model output based on receiving an input of at least one image frame. In some implementations, the model output can be a binary determination that an object is present or not present in the image data. For instance, the model can output a first label/response (e.g., 1 or True) indicating that the machine-learned object detection model determined a high likelihood that an object is present or a second label/response (e.g., 0 or False) indicating that the machine-learned object detection model determined a low likelihood that an object is present.

In some implementations, the machine-learned object detection model can be multi-headed and can be configured to generate multiple model outputs. At least one of the model outputs can indicate the presence of one object in the image. Additional model outputs can indicate a localization and/or count for each object. The localization may include a bounding box, a centroid, a segmentation, or other similar method or combination thereof for identifying each instance of the object.

Additionally or alternatively, the model output and/or the input used to generate the model output can be provided to a second machine-learned model. For some implementations, the second machine-learned model can be configured to determine the additional model outputs such as the localization. Additionally or alternatively, the second machine-learned model may be configured to perform a type of image analysis such as optical character recognition (OCR), classification, or labeling. It should be understood that even though the second machine-learned model may generate more complex outputs, these outputs may still be used at least in part to determine a sensor output (e.g., an analog signal).

As one example for illustration, implementations according to the present disclosure may include transformations for converting the model output(s) to the sensor output. As one example, the transformations can include accessing and/or transmitting the model output(s) to a policy selector to determine a device policy. The device policy may include an encryption to obfuscate the model output(s) by generating encrypted model output(s) that can be used at least in part to determine the sensor output. Alternatively, the device policy may indicate that a model output does not need the encryption and can be directly used to determine the sensor output.

After the sensor output is determined, the sensor output can be provided for storage and/or to initiate a sensor action such as triggering an alarm, transmitting a signal, accessing remote and/or local applications, controlling HVAC, changing a traffic signal, or combinations thereof. Aspects of providing the sensor output for storage can include mapping the sensor output to a value, a label, or both. Further certain information derived from the sensor output (e.g., the value and/or the label) can be stored in addition or in lieu of storing the sensor output. Some non-limiting examples of information derived from the sensor output can include a count of the number of objects, an object action (e.g., a number of objects that entered or left the area that the sensor is evaluating), and an object label (e.g., a class or an OCR derived alphanumeric text). Such information can be stored locally on the sensor or may be transmitted to a remote device or server. For instance, certain sensors may include computing systems that have one or more communication applications configured to transmit data. Alternatively, some sensors may be completely closed to transmission of data, and any information derived from the sensor output may only be stored or used locally.

One example aspect of providing the sensor output can include transmitting the output as an analog signal (e.g., an electric signal) using one or more output connections. Each of the one or more output connections can be independently configured to transmit sensor outputs derived from different machine-learning tasks. More particularly, one of the one or more output connections may be used to provide the analog signal indicating an object is present, another of the connections may be used to provide an analog signal representing the number of objects, another of the connections may be used to provide a label for the object, etc. In this manner, sensor output can only be provided to external applications or systems as a bare signal that would not include any identifying or extraneous information. The external application or system can then include instructions for decrypting and/or mapping the signal to determine the actual value.

While much of the present disclosure has been discussed through the example use case of detecting living objects such as people, low footprint detectors can also be used in traffic applications such as license plate reading and/or other use cases. Such a detector could process real-time traffic information to detect instances of license plates and perform OCR on one or more of the license plates to generate a corresponding string of alpha numeric characters. For instance, the machine-learned object detection model may be configured to perform classification and/or OCR in addition to object detection to determine the license plate string and/or the state associated with the license plate. Alternatively, a second machine learned model may be configured to perform classification and/or OCR and the machine-learned object detection model may only be configured to detect the presence of license plates. The outputted sensor signal can identify any recognized license plate identifier; can identify any recognized license plate identifier that matches an identifier included in a predefined list (e.g., screening for specific identifiers); and/or other outputs (e.g., count, etc.).

Example Devices and Systems

Figure 1A:
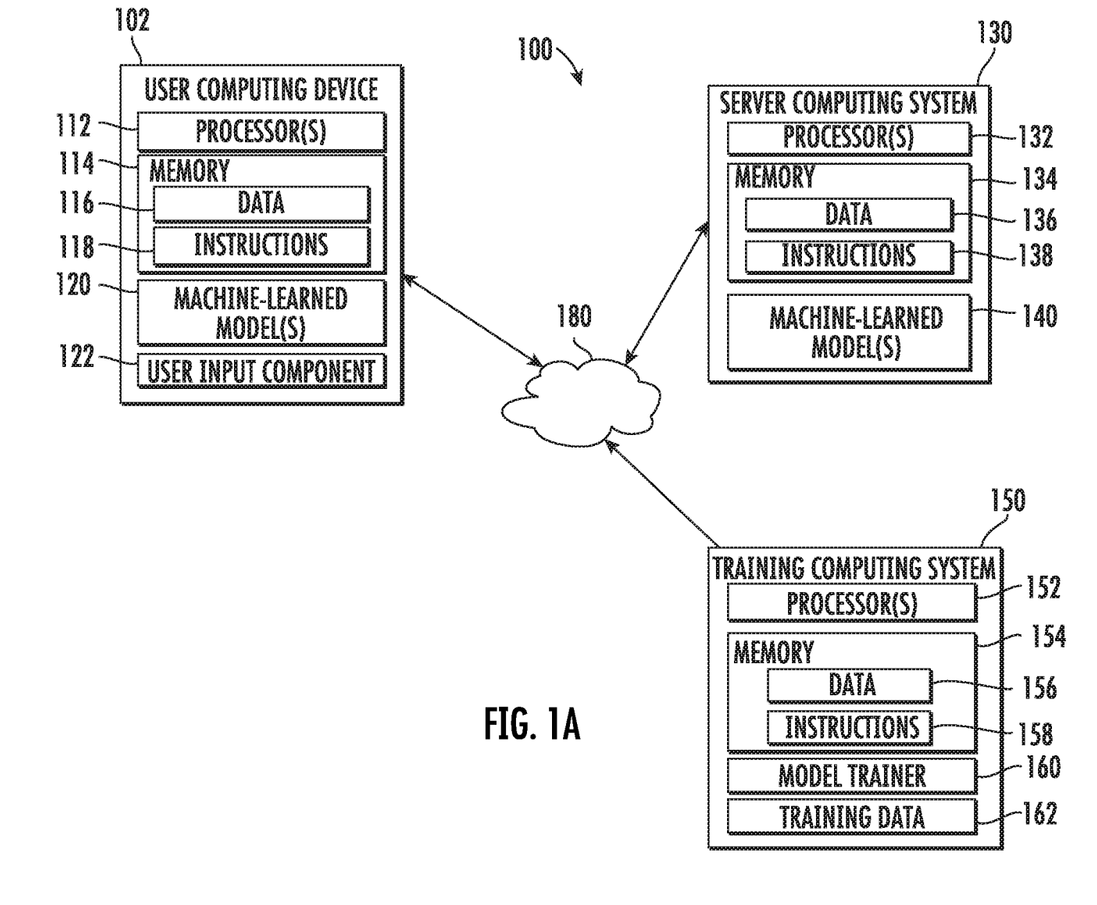
FIG. 1A illustrates an example computing system for a privacy preserving sensor that includes one or more machine-learned model(s) in accordance with example implementations of the present disclosure.

FIG. 1A depicts a block diagram of an example computing system 100 that can store or transmit information such as machine-learned models 120 or 140 according to example aspects of the present disclosure. In one example implementation, the system 100 can include a sensor system 102 and a server computing system 130 that are communicatively coupled over a network 180.

The sensor system 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the sensor system 102 to perform operations.

In some implementations, the sensor system 102 can store or include the machine-learned model(s) such as object detection models having model architectures according to example implementations of the present disclosure.

In certain implementations, the machine learned model(s) 120 can be received from the server computing system 130 over network 180, stored in the user computing device memory 114, and then used or otherwise implemented by the one or more processors 112. In some implementations, the sensor system 102 can implement multiple parallel instances of a single machine-learned model (e.g., to perform parallel object detection and/or localization for real-time image processing such as in video streams, to perform parallel object detection and/or localization in a single image or different regions of a single image, or both).

Additionally or alternatively, the machine-learned model(s) 120 can be included in or otherwise stored and implemented by the server computing system 130 that communicates with the sensor system 102 according to a client-server relationship. For example, the machine-learned model(s) 140 can be implemented by the server computing system 130 as a portion of a web service. Thus, the machine-learned model(s) 120 can be stored and implemented at the sensor system 102 and/or machine learned model(s) 140 can be stored and implemented at the server computing system 130. The machine learned models 120 can include an object detection model such as a model including one or more heads that can generate predictive model outputs to indicate whether input images display the presence of one or more objects of a specific object type/class (e.g., human persons), a property of the one or more objects (e.g., an object count), or both the presence and the property of the one or more objects.

In some implementations, the machine-learned models 120 can also include a second, separate model and/or computer algorithm that can be configured to receive output(s) from the object detection model and generate object features such as vertex coordinates for a bounding box. For example, a vertex identification model or algorithm can receive information such as the heat maps and/or distance fields generated by the object detection model to generate 2D-coordinates (e.g., x, y-coordinates) for each of the vertices of a bounding box. Alternatively, the object detection model can generate localization information such as vertex coordinates and/or object centroid coordinates, and a second machine-learned model can be configured to perform an image analysis such as optical character recognition (OCR) based at least in part on model output (e.g., localization information) generated by the object detection model.

For performing object detection and/or localization, each of these machine-learned model(s) and/or algorithms can be individually accessed and/or transmitted between the sensor system 102 and the server computing system 130. Alternatively, the machine-learned model(s) and/or algorithms can be combined in a single architecture that can be included as part of memory 114 on the sensor system 102, on memory 134 included on the server computing system 130, or both. For instance, including all of the machine-learned model(s) on a single device may improve efficiency and/or security by reducing the need for data transmission between the sensor system 102 and the server computing system 130. In turn, this can improve performance for substantially real-time operation. Additionally, including all of the machine-learned models(s) at the sensor system 102 can improve device privacy, since none of the machine-learned models or information derived from the machine learned model(s) needs to be exposed though transmission outside of the sensor system 102.

The sensor system 102 can also include one or more cameras 122 that can obtain image data for an area evaluated by the sensor. For example, the camera(s) 122 can include a lens for adjusting the field of view for the camera (e.g., a small-wide field). In general, while implementations according to the present disclosure can include one or more communications interfaces, certain implementations can be limited to only including communications interfaces for providing an analog output. For instance, example interfaces can include electrical connections that can transmit an analog signal such as a voltage from the interface to an electrical connection (e.g., a circuit or a wire). Further, certain implementations may lack a communications interface for accessing and/or modifying the machine-learned model(s) 120 or information derived from the machine-learned model(s) 120 such as model output(s), model intermediate values (e.g., hidden layer values), or both. As an example, certain sensor systems 102 may lack a user interface that includes elements for accessing memory 114 components including data 116 and instructions 118. For instance, example sensors can lack an interface that includes elements for receiving a user input (e.g., a touch, a click, a command entry, etc.) to access parameters for the machine-learned model(s) 120, data 116 stored on the memory 114, instructions 118 stored on the memory 114, or other transitory or non-transitory features stored on computer readable media of the sensory system 102.

Another aspect of the sensor system 102 can include a housing covering a portion or all of the sensor system 102. The housing can be made of a variety of materials, including plastics, metals, ceramics or combinations of these materials. The housing provides a physical barrier to limit access to software and hardware components that underlie the sensor system 102. For instance, in some implementations, the housing can be made of a tamper resistant material that is hard but not brittle such as a high-density plastic (e.g., high-density polypropylene). Further, the housing can protect the sensor system 102 for application such as outdoors monitoring, where the sensor could be exposed to elements such as water that could damage components of the sensor system 102.

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include machine learned model(s) 140. Example machine-learned models include neural networks or other multi-layer non-linear models. Example neural networks include feed forward neural networks, deep neural networks, recurrent neural networks, and convolutional neural networks.

The network 180 can various communications networks, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, communication with the server computing system 130 can be limited such that no image data obtained by the sensor system 102 can be transmitted to the server computing system 130 or to other external computing systems. For instance, to better improve data privacy, the sensor system 102 can include two types of memory: one for temporary storage that can be erased or otherwise removed and one for long-term storage that can be frozen or only updated based on certain device policies such as a manufacturer key. As an example, the sensor system 102 can include a temporary data buffer for storing images obtained by the camera(s) 122. The temporary data buffer can store data 116 such as one or more image frames that together can be considered a data stream. After processing the data stream by the machine-learned model(s) 120, the temporary data buffer can be overwritten (e.g., with a new data stream) or cleared (e.g., erased) such that image data is not kept for storage in memory 114. Additionally, certain implementations may include instructions 118 that limit (e.g., prevent or obscure through encryption) communication of data stored in the temporary data buffer to an external system such as the server computing system 130.

FIG. 1A illustrates one example computing system that can be used to implement the present disclosure. It should be understood that other computing systems can be used as well.

Figure 1B:
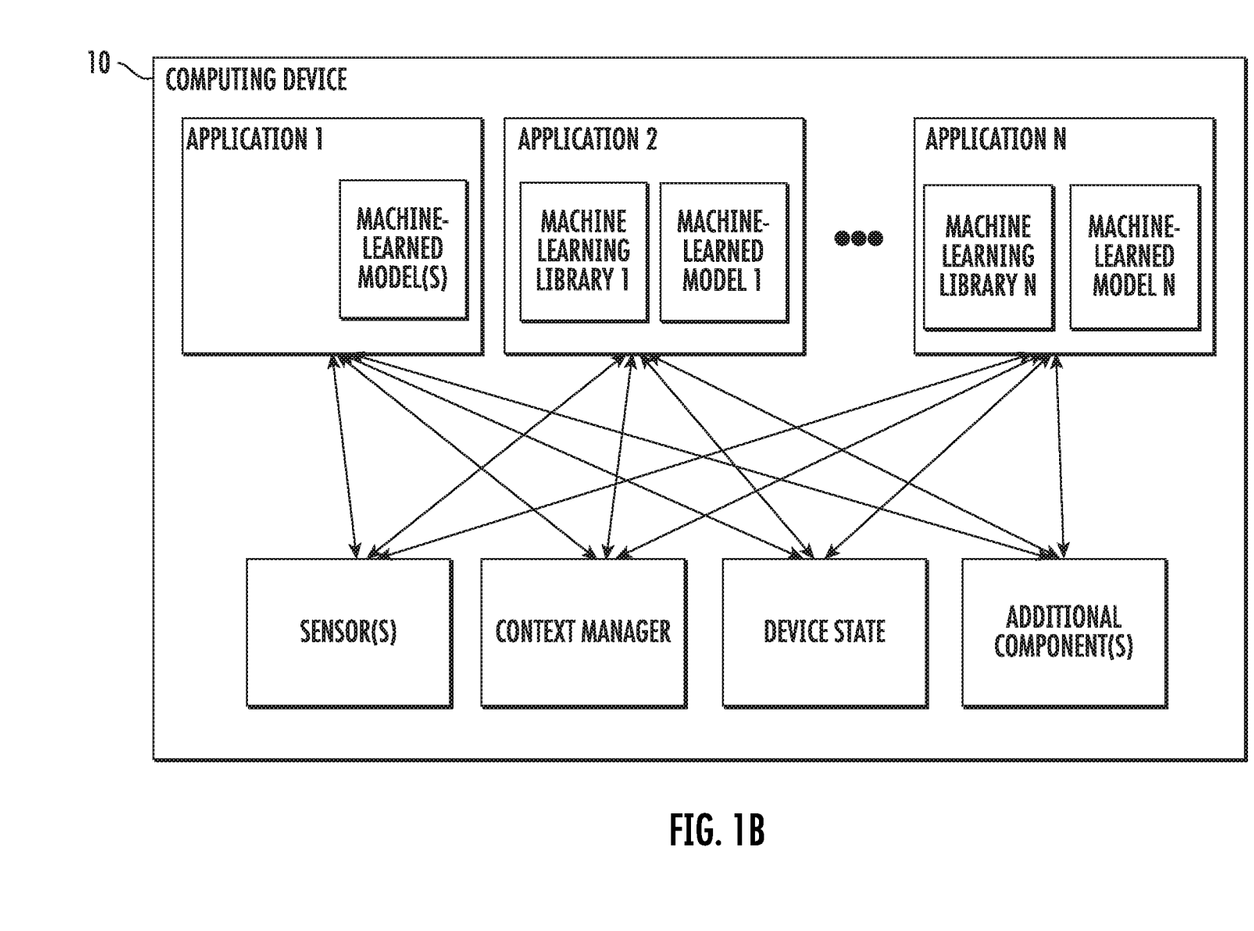
FIG. 1B illustrates an example computing device including one or more machine-learned models(s) in accordance with example implementations of the present disclosure.

FIG. 1B illustrates an example computing device 10 including one or more machine-learned models that can be included in a sensor system in accordance with the present disclosure. Each of these machine-learned model(s) can be associated with an application such as object detection, labeling, object recognition, OCR or other similar functions described herein. Each machine-learned model can be trained using a machine learning library that can include labeled data for performing supervised training tasks. As one example, one machine-learned model may be configured to determine heats for generating a heatmap of each pixel in an image, the heats may be determined based on proximity to a centroid of the object, based on confidence that a pixel is associated with an object versus the background or a combination of these. This machine learning library can include images that have been labeled with object location(s), bounding box coordinates, segmentation masks or other features learned by example machine-learned models.

In certain implementations, the machine-learned model(s) and/or algorithms can be in communication with other components of the computing device such as sensor(s) (e.g., a camera), a context manager, a device state, or other additional components. For instance, an API can be configured to support communication between a device component such as a camera so that data can be directly sent to the machine-learned model(s) for object detection such as generating object locations and/or object classes in substantially real-time. Additionally, output from the machine-learned model(s) may be used by a context manager to adjust the device state such as by determining a policy for transmitting a signal.

Figure 1C:
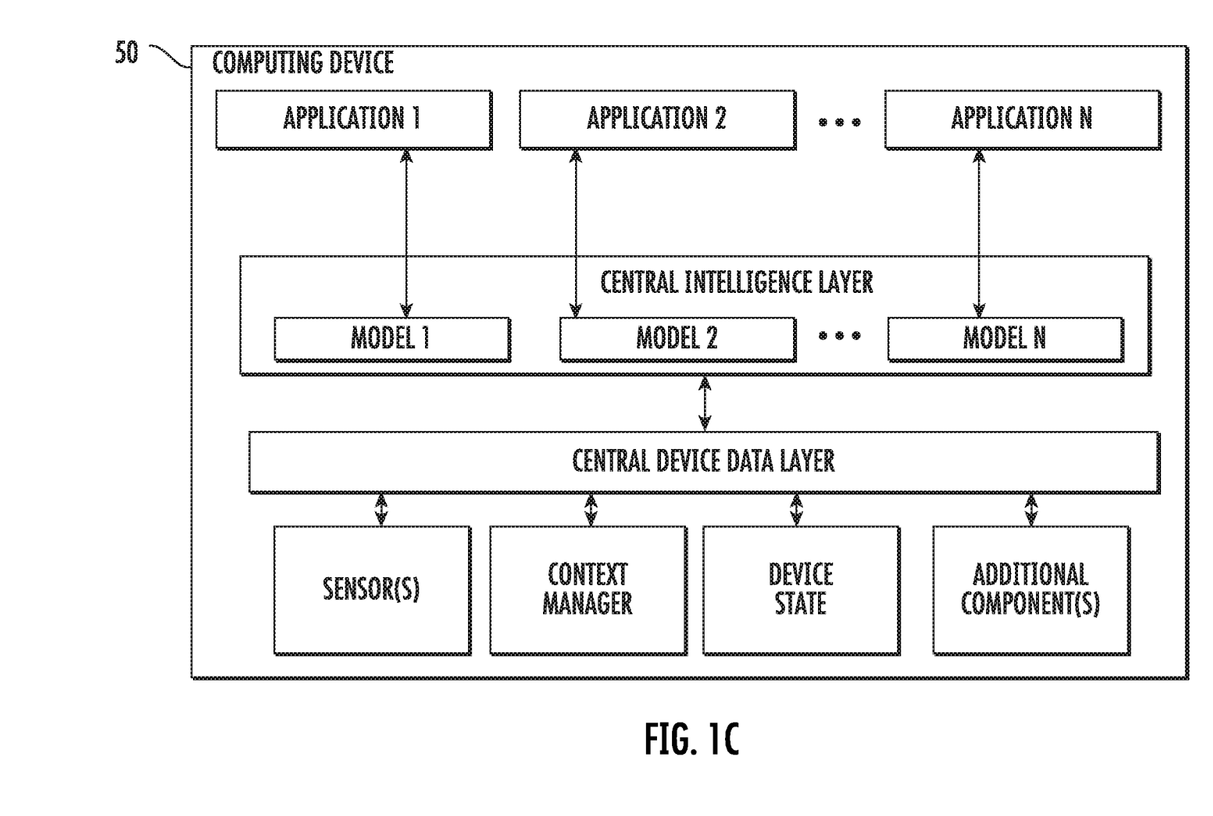
FIG. 1C illustrates another example computing device including one or more machine-learned model(s) in accordance with example implementations of the present disclosure.

FIG. 1C illustrates another example computing device 50. The example computing device 50 can include one or more machine-learned models for image analysis including object detection and/or localization according to example implementations of the present disclosure.

Example Design

Figure 2A:
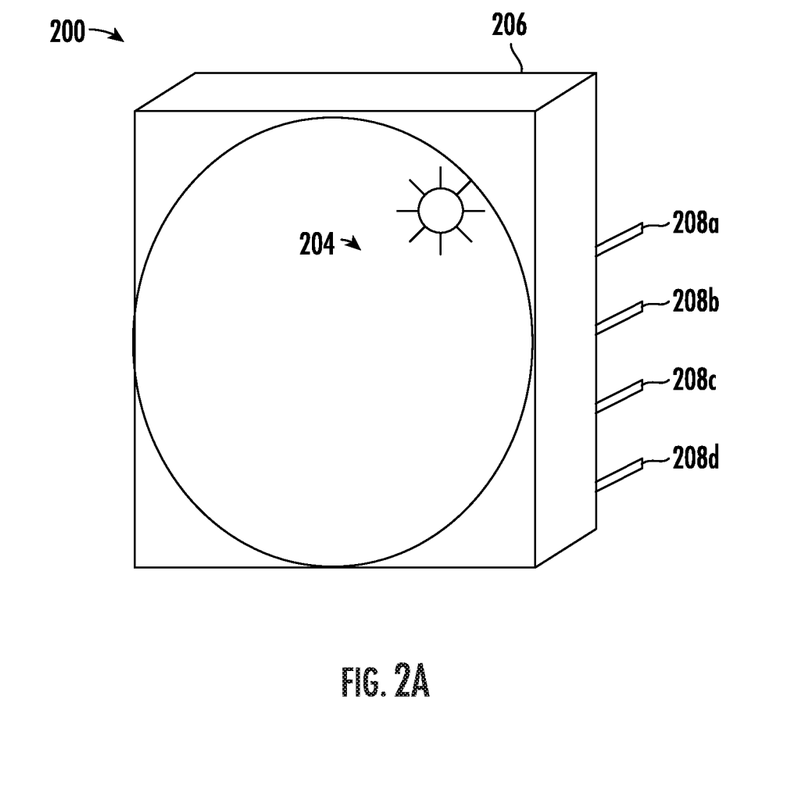
FIG. 2A illustrates an example sensor design in accordance with example implementations of the present disclosure.

FIG. 2A illustrates one example design for a privacy preserving sensor according to example implementations of the present disclosure. As displayed in FIG. 2A, the privacy preserving sensor 200 can include a housing 206 which provides a barrier to accessing a computing system (not shown) enclosed within the housing of the sensor. The computing system can include one or more processors as well as memory for storing data and instruction. The computing system can also include one or more machine-learned models such as an object detection and/or localization model.

As illustrated, the example design can include one or more features to improve data privacy. For instance, example sensors 200 in accordance with the present disclosure can include housing 206 that lacks communications ports and/or interfaces that a user could use to access the computing system. In this manner, implementations can mechanisms to limit exposure of the machine-learned model(s) architecture. Additionally, the housing can substantially cover certain sensor components such as the computing system and for certain implementations a camera.

Aspects of the sensor 200 design can include one or more cameras integrated as part of the sensor 200. For instance, as shown in FIG. 2A, an example sensor 200 can include a camera having a camera lens 204 integrated as part of the housing 206. The camera can be communicably coupled to the computing system, such that information captured by the camera (e.g., video including one or more image frames) can be directly processed by the computing system 202 to determine a sensor output. To perform image detection and localization, an RGB (red-green-blue) camera can be used to generate data associated with the visible light spectrum. Additionally, some implementations may include an IR camera to generate data associated with object temperature that can be used to improve object detection. As one example, temperature data can be used to identify imagery that is not associated with living objects that would emit a heat signal. Thus, example sensors 200 may include cameras that can assist in filtering image data. These additional cameras may increase the sensor size but may provide other benefits such as reducing memory requirements for the temporary data buffer by filtering unnecessary information and/or improving performance of real-time data analysis by the machine-learned models.

For the computing system of the sensor 200, certain implementations may include a single machine-learned model (e.g., a multi-headed model) configured to generate a plurality of model outputs. Alternatively or additionally, some implementations can include a second machine learned model (in addition to the machine-learned object detection model) for generating additional model outputs based at least in part on the model outputs determined by the object detection model. Some or all of the model outputs can be independently used to determine a sensor signal that can be provided at one or more communications interface(s) 208 or may be combined to determine the sensor signal. As illustrated, the communications interface(s) 208*a*, 208*b*, 208*c*, and/or 208*d* may be configured to support providing multiple sensor signals. Additionally, each sensor signal can be separately provided along a unique communications interface 208 associated with a certain model output such as a sensor signal associated with object count, a sensor signal associated with object presence, a sensor signal associated with an object action or other object properties that can be obtained or inferred from the data stream. In some implementations, the sensor 200 can have only four electrical connections which correspond to power+, power−, ground, and sensor signal out.

Figure 2B:
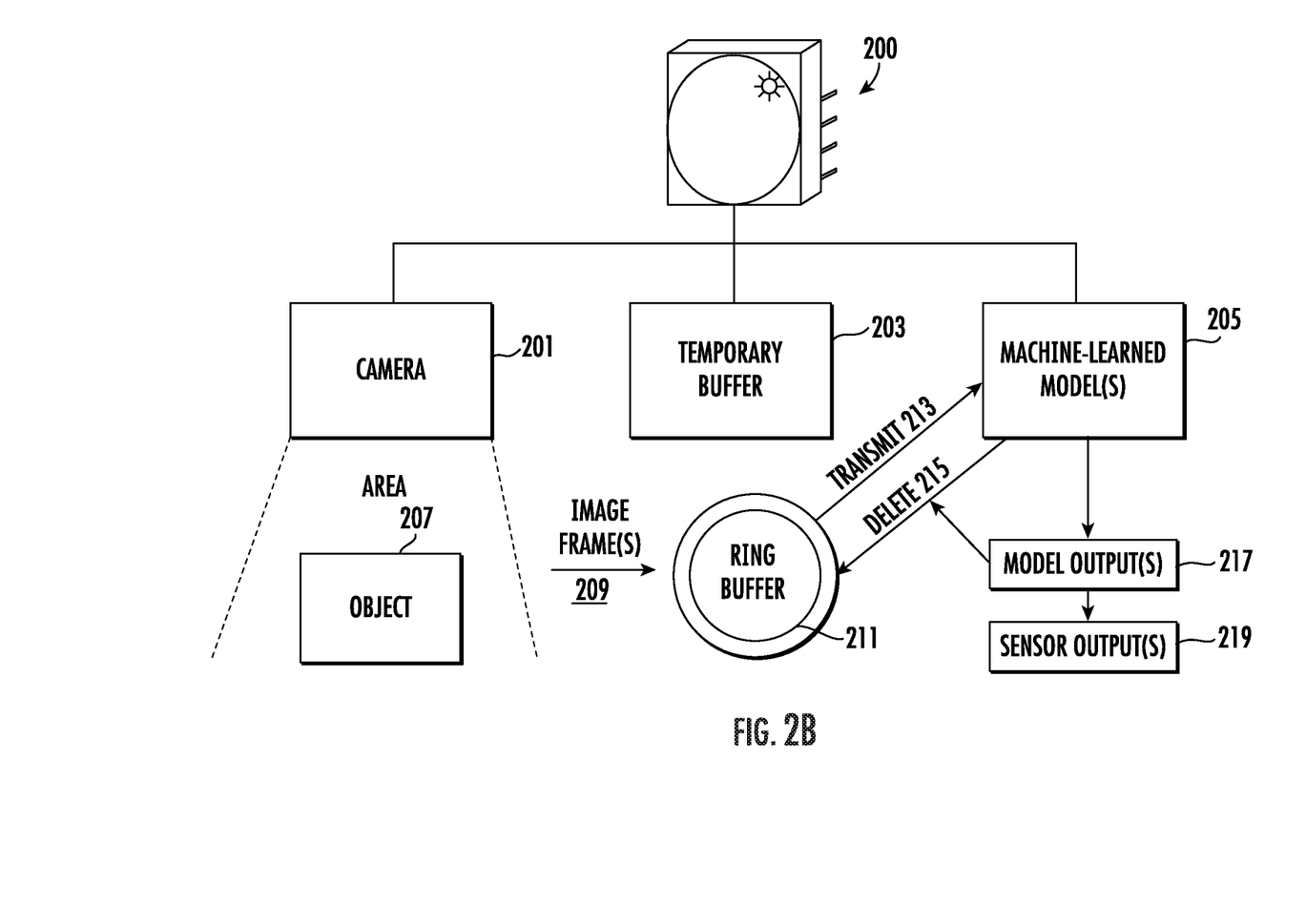
FIG. 2B illustrates an example sensor design including components housed within the sensor in accordance with example implementations of the present disclosure.

FIG. 2B illustrates another example sensor 250 design in accordance with example implementations of the present disclosure. FIG. 2B provides an example of internal features that can be included within the housing of sensor 250. In particular, the sensor is depicted to include a camera 201 positioned to obtain imagery of an area for monitoring the presence of one or more objects 207. Image frames 209 obtained by the camera 201 can be transmitted to a temporary buffer 203 such as a ring buffer 211 for transient storage on the sensor 250. The transient storage (e.g., ring buffer 211) can be accessed and/or configured to transmit 213 information such as the image frame(s) 209 to one or more machine-learned models 205 trained to determine model output(s) 217. Example model output(s) 217 can include as a confidence than an object 207 is present in the image frame(s) 209, a count of detected objects 207 in the image frame(s) 209 and/or other features associated with detected objects 207. After generating the model output(s), a signal can be provided to delete 215 the image frame(s) 209 from the ring buffer 211 and the model output can be used to generate one or more sensor output(s) 219. Alternatively or additionally, the ring buffer 211 may be configured to overwrite the image frame(s) 209 after storing a certain amount of data. Thus, in some implementations, the temporary buffer 203 may have a set amount of writable memory, and after the writable memory is full, any new data obtained by the temporary buffer 203 overwrites previously stored data.

Though not illustrated, additional features for example sensors in accordance with the present disclosure can include one or more lights (e.g., light emitting diodes—LEDs) visible at the exterior of the sensor. The LEDs can be used to signal sensor operation and/or sensor outputs using various patterns. Example sensors can also include one or more mounting elements for attaching the sensor (e.g., attaching the sensor to a wall, a ceiling, a metal pole).

Example Methods

Figure 3:
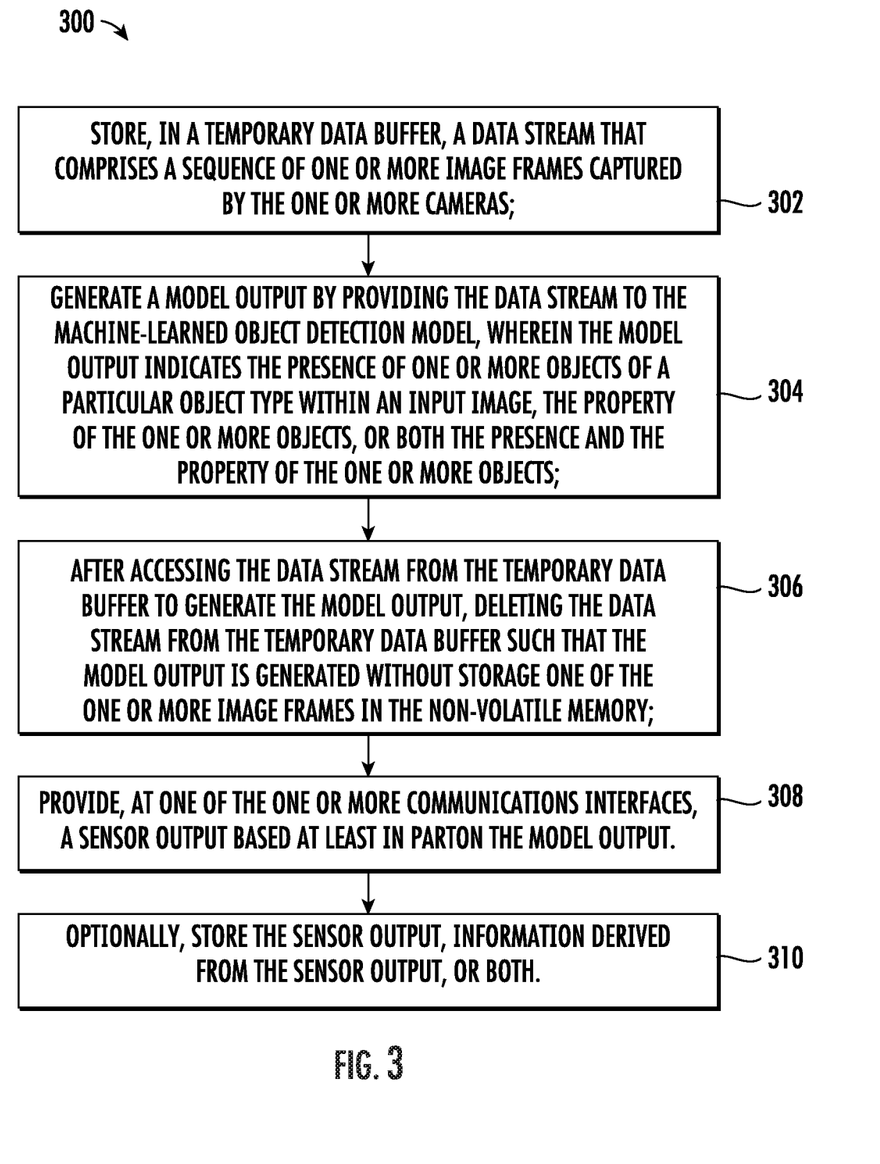
FIG. 3 illustrates a flow diagram depicting an example method for performing object detection according to example implementations of the present disclosure.

FIG. 3 depicts a flow chart diagram of an example method to perform object detection and/or recognition according to example implementations of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system (e.g., the sensor system) can store, in a temporary data buffer, a data stream that comprises a sequence of one or more image frames captured by the one or more cameras. As should be understood, example sensor systems disclosed herein can include or be communicable coupled to one or more cameras that can obtain video or photographic imagery of an area evaluated by the sensor system. Imagery obtained by the camera(s) can be temporarily stored on the temporary data buffer for deletion at a later point. In general, implementations of the disclosure can include features such as a housing that can limit access to the computing system to prevent access or transmission of information stored in the temporary data buffer to provide improved data privacy.

At 304, the computing system can generate a model output by providing the data stream to the machine-learned object detection model. To also improve data privacy, the object detection model can be stored locally on the computing system (e.g., the sensor). Additionally, the machine-learned object detection model can have an architecture for generating one or more model outputs. These model outputs can be produced, for example, using a multi-headed neural network. Alternatively, a second machine-learned model may be configured to receive the model outputs and at least a portion of the data stream to generate additional model outputs in accordance with example implementations of the present disclosure. Example model outputs can include providing a confidence (e.g., a numeric value such as a percent indicating a confidence one or more objects of a particular object type is present in the input image frame(s)) or a binary label (e.g., present/TRUE or absent/FALSE) to represent the presence of the object(s).

For instance, an example object detection model can be configured as a binary classifier to generate the binary label. Alternatively or additionally, an example object detection model can be configured to generate an image similarity score that outputs a score for features associated with the particular object type being present in the image frames. In this manner, the machine-learned object detection model can be trained or otherwise configured to generate one or more model outputs.

At 306, the computing system can be configured to include a privacy feature. For instance, the computing system can determine that the model output has been generated (e.g., using a completion signal) and after accessing the data stream from the temporary data buffer to generate the model output, deleting the data stream from the temporary data buffer. Additionally, deleting the data stream can be performed such that the model output is generated without storage of the one or more image frames in non-volatile memory. In this manner, the temporary data buffer can be available for substantially real-time storage of transient information such as newly captured image frames from a video stream obtained by one of the one or more cameras.

At 308, the computing system can provide, at one of the one or more communications interfaces, a sensor output based at least in part on the model output. Example sensor outputs can include analog signals such as an electric current or voltage. The electric current or voltage may be adjustable using various circuit configurations such that a variable voltage can be output. Alternatively, the electric current or voltage may be static.

At 410, the computing system can optionally store the sensor output, information derived from the sensor output, or both. For example, storing the sensor output can include transmitting the sensor output to a remote system. The remote system may include instructions for converting the sensor output (e.g., a voltage) to an alphanumeric value, a class, or other representation based on a known mapping and/or decryption. In this manner, the sensor output can be stored locally or transmitted without diminishing the privacy preserving aspects of the sensor.

From at least the combination of operations described in FIG. 3, sensors having sensor systems according to the present disclosure can perform object detection and/or localization on low footprint sensors. Aspects of example computing systems that can improve execution on low footprint sensors include reduced memory requirements due to only providing temporary storage of image data as well as substantially real-time (e.g., direct conversion) of the model output to a sensor output.

Example Model and Device Output

Figure 4:
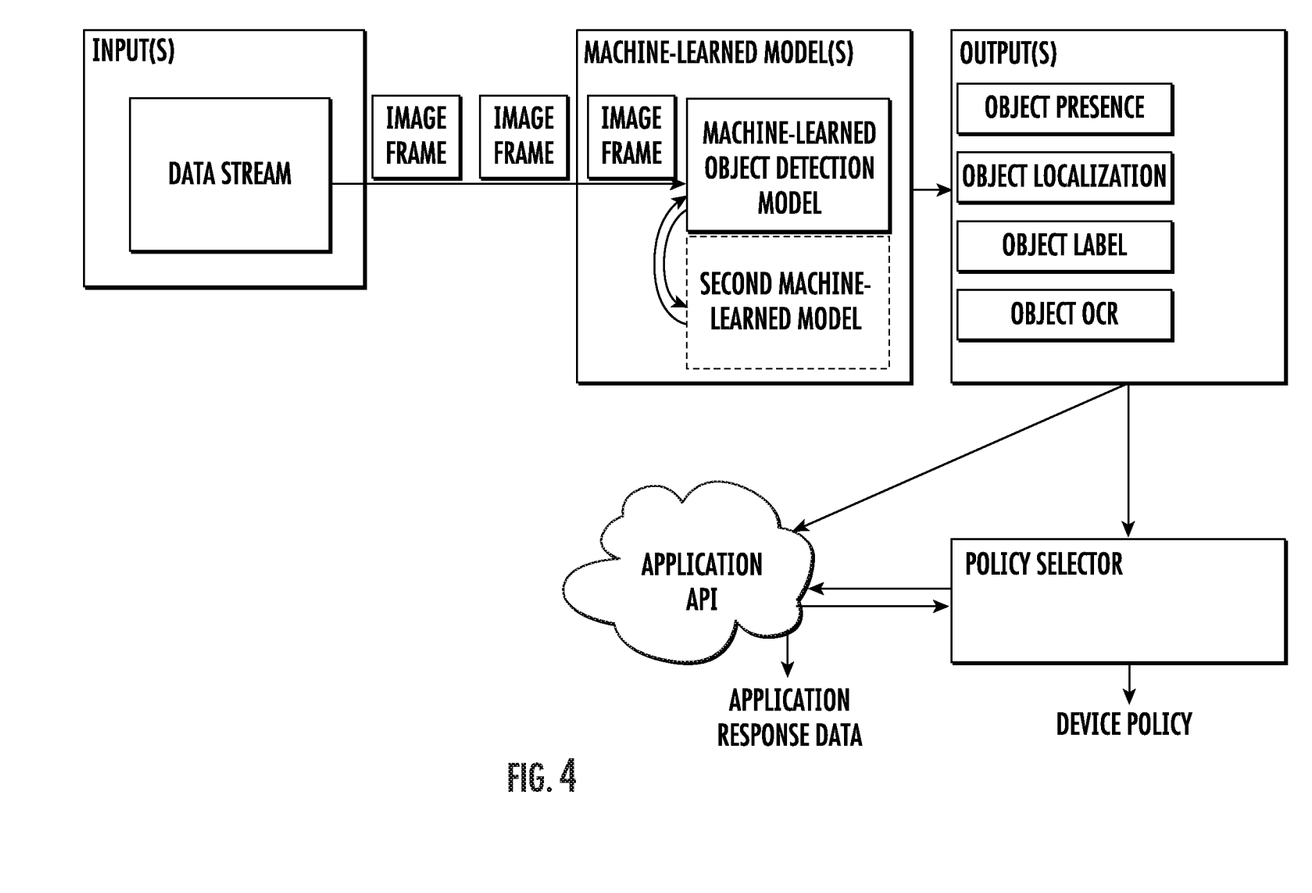
FIG. 4 illustrates an example process flow from input(s) to output(s) as well as possible device responses derived from the output(s) in accordance with example implementations according to the present disclosure.

FIG. 4 depicts an example sensor data flow. The sensor can receive (e.g., for storage in a temporary data buffer) an input(s) of a data stream that includes a continuous sequence of image frames. The one or more of the image frames can be provided to a machine-learned object detection model configured to determine one or more outputs based on the presence or absence of objects having a certain object type in the image frames. For some sensors according to the present disclosure, the sensor may include multiple machine-learned models(s). For instance, a second machine-learned model may be configured to receive some or all output(s) from the machine-learned object detection model and, based at least in part on the output(s), determine a new output. As one example for illustration, the machine-learned object detection model may be configured to determine the presence and localization of certain objects such as license plates in image data (e.g., image frames) and the second machine-learned model may be configured to perform OCR and/or generate a label for the license plate character string and/or the state.

Information generated by the object detection model such as localizations (e.g., bounding boxes, centroids, or other regions of interest) can be provided to the second machine-learned model to help the model distinguish background or other less relevant features of the underlying data from data associated with the object(s). By performing object detection and localization separately from extracting additional data features, processing can be streamlined to reduce operating time. Thus, rather than the second machine-learned model operating over the complete image data (e.g., image frame(s)), the second machine-learned model can leverage information generated by the machine-learned object detection model to learn features for portions of the image data instead of using the entirety of an image frame.

Output(s) of the machine-learned object detection model and/or the second machine-learned model can be independently combined and/or individually sent to other sensor components. For instance, example sensors may include an Application API for communicating model output(s) to an application such as a data encryption application. The data encryption application can receive the model output(s) and generate application response data that can include an encrypted form of the model output(s) and/or an encryption status (e.g., failed, successful, etc.). Alternatively or additionally, example sensors may include a policy selector which can receive the model output(s) and/or application response data generated by the Application API to determine a device policy. The device policy may include instructions for turning on or off voltage gates to provide an analog signal using a communications interface of the device. The device policy may also include instructions for modulating the analog signal (e.g., turning on and off the signal at a certain frequency, or adjusting a feature of the analog signal such as a voltage, etc.)

FIG. 4 depicts one example for data flow in sensors according to the present disclosure. It should be understood that other data flows are possible, including data flow where machine-learned model output is directly converted to generate a sensor signal, without transmission of the output(s) to an application and/or a policy selector of the sensor. For instance, some sensors can include hardwired components that, based on the generation of a certain model output, can directly provide a sensor signal via a communications interface. In particular, a model output indicating the presence of an object of a certain object type can directly lead to providing a sensor output by including a circuit configuration that can be adjusted (e.g., using a switch to close or open the circuit) based on the model output.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A lightweight sensor for privacy preserving detection of objects, the sensor comprising:
    a housing;
    one or more cameras integrally connected to the housing;
    one or more communications interfaces configured to provide a sensor output generated by the sensor;
    one or more processors contained within the housing; and
    a memory contained within the housing, wherein the memory comprises a temporary data buffer and a non-volatile memory, wherein the temporary data buffer is inaccessible via the one or more communications interfaces, and wherein the non-volatile memory stores:
        a machine-learned object detection model, stored locally on the sensor, that is configured to determine a presence of one or more objects of a particular object type within an input image, a property of the one or more objects, or both the presence and the property of the one or more objects; and
        instructions that, when executed by the one or more processors, cause the sensor to perform operations, the operations comprising:
            storing in the temporary data buffer a data stream that comprises a sequence of one or more image frames captured by the one or more cameras;
            generating a model output by providing the data stream to the machine-learned object detection model, wherein the model output indicates the presence of one or more objects of a particular object type within an input image, the property of the one or more objects, or both the presence and the property of the one or more objects;
            after accessing the data stream from the temporary data buffer to generate the model output, deleting the data stream from the temporary data buffer such that the model output is generated without storage of the one or more image frames in the non-volatile memory;
            generating the sensor output from the model output; and
            providing, at one or more of the one or more communications interfaces, the sensor output.

2. The sensor of claim 1, wherein:
    the particular object type comprises human persons; and
    the model output comprises, for each of the one or more image frames, a count integer that describes a number of human persons present in the image frame.

3. The sensor of claim 1, wherein the machine-learned object detection model is a neural network having static parameters.

4. The sensor of claim 1, wherein the sensor output comprises an analog electrical signal.

5. The sensor of claim 4, wherein a voltage of the analog electrical signal corresponds to a count of a number of objects included in the one or more image frames.

6. The sensor of claim 1, wherein the operations are performed substantially in real time.

7. The sensor of claim 1, wherein the operations further comprise storing the sensor output, information derived from the sensor output, or both.

8. The sensor of claim 1, wherein the housing has a size of about 100-2000 mm$^3$.

9. The sensor of claim 1, wherein the housing comprises a tamper resistant barrier to prevent access to the processor, the memory or both.

10. The sensor of claim 1, wherein the housing comprises a tamper evident barrier, the tamper evident barrier configured to display a change in appearance when the processor, the memory or both are physically accessed through the housing.

11. The sensor of claim 1, wherein the sensor does not comprise an interface for accessing the machine-learned object detection model, the model output, any intermediate model outputs, or combinations thereof.

12. The sensor of claim 1, wherein the particular object type comprises vehicular license markings.

13. The sensor of claim 1, wherein the machine-learned object detection model, a second machine-learned model, or both is configured to perform OCR.

14. The sensor of claim 1, wherein the sensor has a false positive rate for determining the particular object type is less than about 1.0%.

15. The sensor of claim 1, wherein the model output assigns a first value when the machine-learned object detection model detects the presence of one or more human persons and assigns a second value, different from the first value, when the machine-learned object detection model does not detect the presence of one or more people.

16. The sensor of claim 1, wherein the property related to the one or more objects comprises an object count descriptive of the number of objects the machine-learned model detects.

17. The sensor of claim 1, wherein the operations further comprise initiating at least one of the one or more cameras based at least in part on a signal from a motion sensor.

18. The sensor of claim 1, further comprising a light emitting diode, wherein the sensor is configured to provide a light output at the light emitting diode, wherein the light output is indicative of the sensor output.

19. A sensor configured to evaluate the presence of people in an area in a privacy preserving fashion, the sensor comprising:
    a housing;
    one or more cameras positioned to obtain imagery of the area and integrally connected to the housing;
    one or more communications interfaces configured to provide a sensor output generated by the sensor;
    one or more processors contained within the housing; and
    a memory contained within the housing, wherein the memory comprises a temporary data buffer and a non-volatile memory, wherein the temporary data buffer is inaccessible via the one or more communications interfaces, and wherein the memory stores:
        a machine-learned object detection model configured to determine a presence of a human person in the area, an action of the human person in the area, a count of human persons in the area, or combinations thereof; and
        instructions that, when executed by the one or more processors, cause the sensor to perform operations, the operations comprising:
            storing in the temporary data buffer a data stream that comprises a sequence of one or more image frames captured by the one or more cameras;
            generating a model output by providing the data stream that comprises the sequence of the one or more image frames captured by the one or more cameras to the machine-learned object detection model stored locally on the sensor;
            after accessing the data stream from the temporary data buffer to generate the model output, deleting the data stream from the temporary data buffer such that the model output is generated without storage one of the one or more image frames in the non-volatile memory;

generating the sensor output from the model output; and providing, at the one or more communications interfaces, the sensor output, wherein the sensor output is indicative of the presence of a human person in the room, the action of the human person in the room, the count of human persons in the room, or combinations thereof.

20. The sensor of claim 19, wherein the action of the human person in the area is selected from: entering the room, leaving the room, or both.

21. A sensor configured to evaluate and read vehicular license markings, the sensor comprising:

a housing;

one or more cameras positioned to obtain imagery of an area and integrally connected to the housing; one or more communications interfaces;

one or more processors contained within the housing; and a memory contained within the housing, wherein the memory comprises a temporary data buffer and a non-volatile memory, wherein the temporary data buffer is inaccessible via the one or more communications interfaces, and wherein the non-volatile memory stores:

a machine-learned object detection model configured to determine a presence of imagery that depicts a license plate;

a second machine-learned model configured to perform optical character recognition; and instructions that, when executed by the one or more processors, cause the sensor to perform operations, the operations comprising:

storing in the temporary data buffer a data stream that comprises a sequence of one or more image frames captured by the one or more cameras;

generating a first model output by providing the data stream to the machine-learned object detection model stored locally on the sensor, wherein the first model output detects a presence of a license plate;

generating a second model output, based at least in part on the first model output, by providing the first model output and at least a portion of the data stream to the second machine-learned model, wherein the second model output comprises a license identifier present on the license plate; and after accessing the data stream from the temporary data buffer to generate the second model output, deleting the data stream from the temporary data buffer such that the second model output is generated without storage of the one or more image frames in the non-volatile memory; and providing, at the one or more communications interfaces, a sensor output based at least in part on the second model output.

22. The sensor of claim 21, wherein the sensor output comprises the license identifier present on the license plate.

23. The sensor of claim 21, wherein:

the sensor output indicates whether the license identifier present on the license plate matches one of a number of predetermined license identifiers; and when the license identifier present on the license plate does not match one of the number of predetermined license identifiers, the sensor output is a null output.

* * * * *